(12) United States Patent
Becker et al.

(10) Patent No.: US 11,413,749 B2
(45) Date of Patent: Aug. 16, 2022

(54) DRIVE UNIT OF AN AUTOMATION COMPONENT, IN PARTICULAR A GRIPPING, CLAMPING, AND CHANGING OR PIVOTING UNIT

(71) Applicant: SCHUNK GmbH & Co. KG Spann-und Greiftechnik, Lauffen am Neckar (DE)

(72) Inventors: Ralf Becker, Marbach (DE); Joern Rastetter, Brackenheim (DE); Alexander Kupsch, Brackenheim (DE); Michael Ohlheiser, Eschelbronn (DE)

(73) Assignee: SCHUNK GmbH & Co. KG Spann-und Greiftechnik, Lauffen am Neckar (DE)

( * ) Notice: Subject to any disclaimer, the term of this patent is extended or adjusted under 35 U.S.C. 154(b) by 293 days.

(21) Appl. No.: 16/617,596

(22) PCT Filed: May 23, 2018

(86) PCT No.: PCT/EP2018/063541
§ 371 (c)(1),
(2) Date: Nov. 27, 2019

(87) PCT Pub. No.: WO2018/219744
PCT Pub. Date: Dec. 6, 2018

(65) Prior Publication Data
US 2020/0180152 A1 Jun. 11, 2020

(30) Foreign Application Priority Data
May 29, 2017 (DE) ...................... 10 2017 111 651.6

(51) Int. Cl.
*B25J 13/02* (2006.01)
*B25J 9/16* (2006.01)
(Continued)

(52) U.S. Cl.
CPC ............. *B25J 9/1643* (2013.01); *B25J 9/161* (2013.01); *B25J 9/1674* (2013.01); *B25J 9/1694* (2013.01);
(Continued)

(58) Field of Classification Search
CPC ...... B25J 9/1643; B25J 9/1674; B25J 9/1658; B25J 9/1694; B25J 9/161; B25J 9/1612;
(Continued)

(56) References Cited

U.S. PATENT DOCUMENTS 8,886,358 B2 * 11/2014 Sato ........................ G05B 15/02
700/253
9,259,839 B2 * 2/2016 Ogoh .................... G05B 19/406
(Continued)

FOREIGN PATENT DOCUMENTS

| JP | H01-310882 A | 12/1989 |
| JP | 2006-059308 A | 3/2006 |
| JP | 2016-032858 A | 3/2016 |

OTHER PUBLICATIONS

Jose Fortin et al. "General environment for human interaction with a robot hand-arm system and associate elements" Emerging Technologies and Factory Automation (ETFA), 2010 IEEE Conference on, IEEE, Piscataway, NJ, USA, Sep. 13, 2010 (Sep. 13, 2010),pp. 1-8 DOI: 10.1109/ETFA.2010.5641453.
(Continued)

*Primary Examiner* — Dalena Tran
(74) *Attorney, Agent, or Firm* — George McGuire

(57) ABSTRACT

Drive unit of an automation component, in particular a gripping, clamping, changing, linear or pivoting unit, whereby the drive unit includes a drive for driving the movable parts of the automation component and a control unit which controls the drive, whereby the control unit includes at least one computing device, and the drive unit
(Continued)

together with the drive, control unit and computing device is arranged in or on a base housing of the automation component.

11 Claims, 1 Drawing Sheet

(51) Int. Cl.
   *B25J 13/08* (2006.01)
   *B25J 19/02* (2006.01)
   *B25J 19/06* (2006.01)

(52) U.S. Cl.
   CPC .......... *B25J 13/085* (2013.01); *B25J 13/086* (2013.01); *B25J 13/087* (2013.01); *B25J 19/02* (2013.01); *B25J 19/066* (2013.01); *B25J 9/1612* (2013.01); *B25J 9/1658* (2013.01)

(58) Field of Classification Search
   CPC ........ B25J 19/066; B25J 19/02; B25J 13/085; B25J 13/086
   USPC .......... 700/253, 245, 262, 83; 414/5; 702/32
   See application file for complete search history.

(56) References Cited

U.S. PATENT DOCUMENTS

| | | |
|---|---|---|
| 2003/0050735 A1 | 3/2003 | Griffis |
| 2012/0210199 A1 | 8/2012 | Gale et al. |
| 2013/0184980 A1* | 7/2013 | Ichikawa ............... B25J 9/1676 701/301 |
| 2016/0167227 A1* | 6/2016 | Wellman ................ B25J 9/1612 700/259 |
| 2017/0081461 A1 | 3/2017 | Verbeke et al. |
| 2018/0099408 A1* | 4/2018 | Shibata .................. B25J 9/1674 |

OTHER PUBLICATIONS

Anonymous, "Intelligent hands tor human/robot collaboration" Apr. 30, 2017 (Apr. 30, 2017), pp. 1-8, Retrieved from the Internet: https://schunk.com/nl_en/news/highlights/notifications/article/3068-intelligent-hands-for-humanrobot-collaboration/ [retrieved on Jul. 20, 2019].
International Search Report and Non-Translated Written Opinion Form PCT/IS/210 and PCT/ISA/237, International Application No. PCT/EP2018/063541, pp. 1-11, International Filing Date May 23, 2018, mailing date of search report dated Sep. 3, 2018.
Non-translated German Examination Report, pp. 1-6.
Translated communication from the Japanese Office, dated Apr. 6, 2021.

* cited by examiner

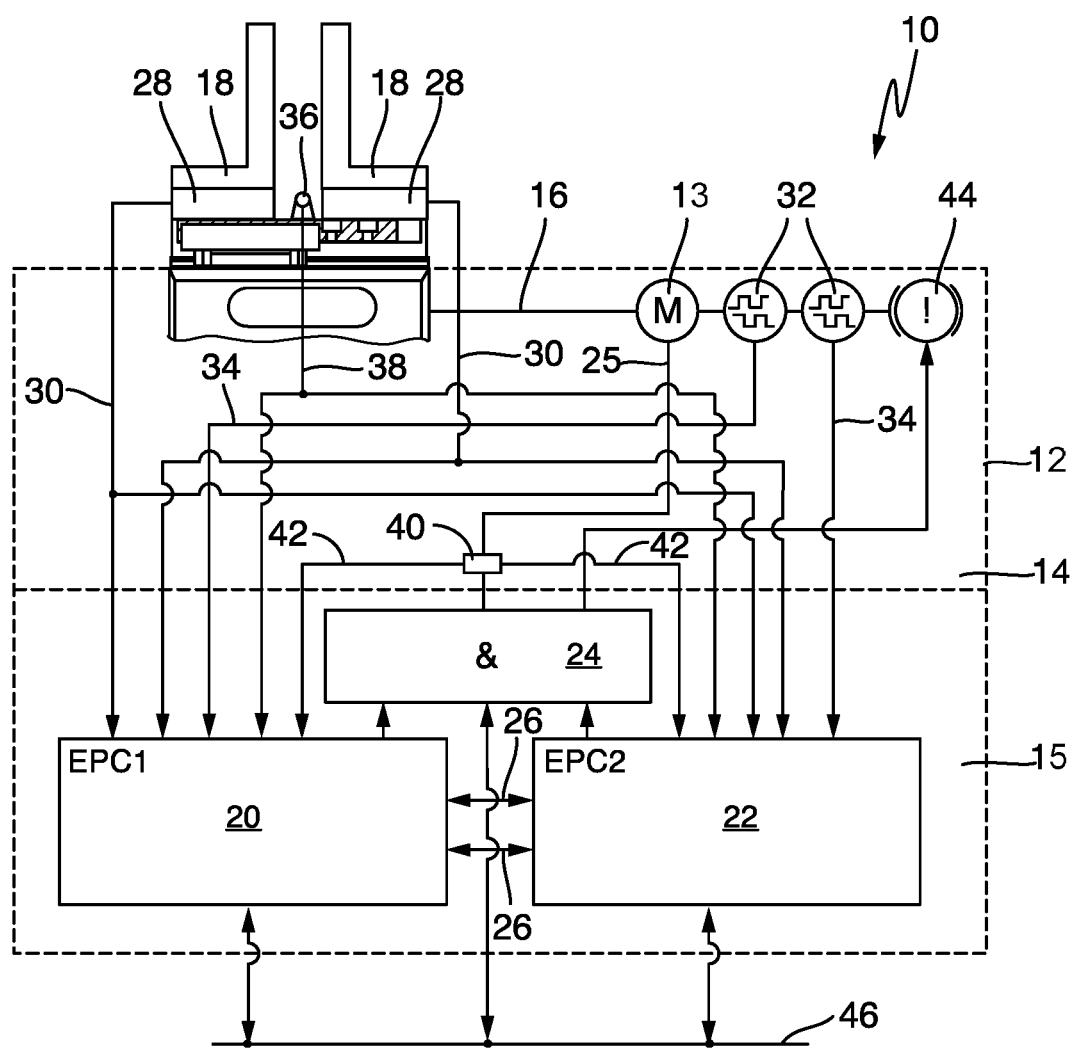

DRIVE UNIT OF AN AUTOMATION COMPONENT, IN PARTICULAR A GRIPPING, CLAMPING, AND CHANGING OR PIVOTING UNIT

CROSS REFERENCE TO RELATED APPLICATIONS

This is a U.S. National Stage Application, filed under 35 U.S.C. 371, of International Patent Application No. PCT/EP2018/063541, filed on May 23, 2018, which claims priority to German Patent Application No. 10 2017 111 651.6 filed on May 29, 2017, contents of both of which are incorporated herein by reference in their entireties.

BACKGROUND

The invention relates to a drive unit of an automation component, in particular a gripping, clamping, changing, linear or pivoting unit which is arranged in or on a base housing of the automation component and comprises a drive and a control unit. The control unit is used in particular for controlling the drive of the movable parts of the automation component; for example, in a gripping unit, the drive for the base jaws, and in a pivot unit, the drive for the pivot plate.

Drive units of an automation component, in particular a gripping, clamping, changing, linear or pivoting unit are used in handling and robotics and serve for handling, gripping units, for example, of components and pivot units for pivoting gripping units or gripped components. Linear units are used to move workpieces along a linear axis. Exchange units are used to change workpieces or tools. Clamping units are used for clamping workpieces or workpiece carriers. In particular, clamping units can also be zero-point clamping systems for repeated, position-accurate clamping.

Gripping and pivoting units are known from the prior art, which include control units and motor controllers separately formed therefrom.

The control unit processes input signals and generates control signals dependent on the input signals. The control signals of the control unit are made available for example via a bus system of a higher-level control, which then controls the motor controller. It is also conceivable that the output signals of the control unit are sent directly to the motor controller via appropriate data lines.

The motor controller comprises power electronics for supplying the electric drive with motor current depending on the control signals. The motor controller thus acts directly on the current provided by a current source for energizing the drive.

The control units, with which the electric drive and in particular the position and operating points of the movable parts are controlled due to appropriate programming upon the interposition of the motor controller, are programmed at the lowest programming level and cannot be reprogrammed after their installation, or only with relatively great effort. As a result, such gripping and pivoting units cannot be used flexibly, especially with changing requirements.

US 2003/0050735 A1 discloses a safety circuit for a movement-control system, which comprises a control unit (motion controller) and a motor controller (servo amplifier). From US 2014/0081461 A1 a redundant, robotic manipulator is known which drives a field device, for example a motor, via a bus system.

Furthermore, there is a need to be able to use drive units in human-robot cooperation (MKR [HRC]). For this purpose, special requirements are used for the drive units. The known drive units are not or are only conditionally suitable to be used in such a human-robot cooperation (MKR [HRC]).

The object of the present invention is to provide the above-mentioned drive units of automation components which remedy the disadvantages mentioned and which can be used in a flexible manner. In particular, a drive unit will propose an automation component that can be used in a human-robot cooperation (MKR [HRC]).

SUMMARY OF THE INVENTION

This object is achieved with a drive unit comprising at least one computing device provided with an operating system by means of which programs that are written in a higher programming language or programs which are translated from a higher programming language can run on the computing device. The at least one computing device comprises, for example, a memory on which the operating system is stored and a processor which is designed to execute instructions of the operating system. For example, programs that are written in a higher programming language or programs that are translated from a higher programming language can also be stored on the memory. The processor is designed by means of the instructions of the operating system to execute such programs from the memory on the computing device. In particular, common systems based on Windows, Linux or Apple are possible as operating systems. Alternatively, there are also special operating systems in question, for example, based on a common system, such as on a Linux operating system, but which contain product-specific components and also can be formed in a tamper-resistant manner. Higher languages can be common languages such as Java, C++, Python, PHP or Ruby. This has the advantage that programming can be done relatively easily with common programming languages.

The invention can also be used in a human-robot cooperation (MKR [HRC]), in which case preferably two separate and independently operating computing devices are provided for redundant data processing. This can be used to ensure that required safety levels required for the MKR [HRC] are achieved. All input and output signals can be processed in a diversified manner and/or redundantly by the two computing devices, wherein the two computing devices monitor each other. The mutual monitoring takes place in particular such that the operating states of the two computing devices are known with very high probability, or are known such that they correspond to the values required in the MKR [HRC] standards for "functional safety" and thus a given functional safety can be guaranteed.

The two computing devices form a common evaluation logic or they are followed by a logic device, with which a mutual monitoring and/or with which the adjustment of the redundant output signals of the two computing devices takes place.

It is particularly advantageous if at least one computing device is designed as a single-board computer, in particular as a mini-PC. A single-board computer (SBC) is a computer system in which all the electronic components necessary for operation are combined on a single circuit board. Typically, only the power supply is housed separately as a single component. Such single-board computers can be programmed very flexibly, whereby the drive unit can be used flexibly accordingly.

Unlike in known automation components and in particular in known gripping and pivoting units, it can be provided that the at least one computing device is programmed and set up for direct control, i.e. power supply to the drive without the interposition of a motor controller. The computing device then takes over the function of the motor controller or forms then the motor controller. At least one computing device, and preferably both computing devices, thus form the power electronics for the electric drive and supply the electric drive with current and control the drive directly and without the interposition of a separately designed motor controller; i.e. they supply the electric drive directly with the motor current and thus act directly on the current provided by a current source for energizing the drive. In particular, no control signals generated by the control unit are then passed on to other power components or higher-level control systems, for example via corresponding control lines or corresponding bus systems for controlling the motor current. The implementation of the motor controller in the computing unit is only possible because the computing unit is set up with a corresponding operating system. Due to the possibility of relatively simple programming of the computing devices, the control and regulation of the drive motor can be changed in a simple manner. Such a change is not possible or is comparatively very difficult in the known prior art, since, on the one hand, the control unit and, on the other hand, the motor controller would have to be reprogrammed at the lowest programming level.

The computing devices are preferably part of a control loop and regulate the motor current, in particular depending on the position and/or the operating points of the movable parts or the height of the motor current, and/or control an electric motor brake, for example, depending on corresponding input signals. Since a separate motor controller is eliminated, the structure can be simplified and the number of electronic components to be provided can be reduced.

At least one computing device is advantageously set up not only for controlling the drive, but also for maintenance, for data transmission, for diagnosis and/or for programming. Consequently, maintenance intervals can be automatically performed with the computing device. A data transmission, for example in a network and a higher-level control, is also conceivable. Furthermore, diagnostic functions can be performed. Due to the programming, it is possible to flexibly adapt all functions to the respective requirements.

According to the invention, it can further be provided that the at least one computing device has a user interface or can be connected to a user interface. The user interface can preferably be formed by a display, a tablet or a smartphone. In particular, the connection with a tablet computer is advantageous, since it is to be provided in particular when a diagnostic evaluation or programming is to take place on site.

According to a further embodiment of the invention, sensors are provided in or on the automation component, wherein the sensor data generated by the sensors are processed by the at least one computing device, and in the case of human-machine cooperation by the two computing devices.

The sensors can be designed as displacement sensors, force measuring sensors, rotary encoder sensors, current measuring sensors, proximity sensors, temperature sensor, humidity sensor and/or as a camera module. Depending on the application and the measured variable to be determined, one or more similar sensors can be used in each case. Of course, further sensors may be provided within the scope of the invention.

The at least one computing device can be accommodated within the basic housing or in a mounting housing mounted on the base housing. The provision of mounting housings has the advantage that for different automation components such as in particular gripping units and pivot units, each a similar or identical mounting housing can be used.

The aforementioned object is also achieved by an automation component, in particular by a gripping, clamping, changing, linear or pivoting unit, which provides a drive unit according to the invention. The automation component thus represents an embedded system in which the computing device is integrated in the automation component. The computing device assumes in particular monitoring, control or regulating functions and/or is responsible for a form of data or signal processing.

BRIEF DESCRIPTION OF THE DRAWINGS

Further details and advantageous embodiments of the invention can be found in the following description, on the basis of which one exemplary embodiment of the invention is described and explained in more detail.

FIG. 1 shows a schematic representation of an automation component according to the invention in the form of a gripping unit 10, as can be used in a human-robot cooperation (MRK [HRC]).

DETAILED DESCRIPTION

FIG. 1 shows a gripping unit 10 according to the invention, said gripping unit having a schematically indicated base housing 12 and a drive unit 14 provided in the base housing 12 comprising a drive 13 in the form of an electric motor. The drive 13 drives a shaft 16 shown schematically, which is movably coupled with two jaws 18 which are arranged to be moved towards and away from each other.

For controlling the drive 13, a control unit 15 with two computing devices in the form of single-board computers 20, 22 are provided in the housing 12. The two single-board computers 20, 22 are followed by an evaluation unit 24, which checks the output signals of the single-board computers 20, 22 for their redundancy. In addition, the two single-board computers 20, 22 are connected to each other via lines 26 for mutual monitoring. The evaluation unit 24 can also be implemented in one of the single-board computers 20, 22. Further, a power line 25 is provided, with which the drive 13 is supplied with motor current.

The single-board computers 20, 22 are equipped with a special operating system, which is based for example on Linux and designed to be tamper-proof. Furthermore, the single-board computers 20, 22 are programmed with programs written in a higher programming language such as C++, according to the respective gripping task.

Unlike the known automation components, it is also provided—as can be seen from FIG. 1—that the single-board computers 20, 22 are programmed and set up for direct control of the drive 13 without the interposition of a motor controller. The single-board computers 20, 22 thus form the power electronics for the drive 13 and control the motor current for the drive 13 directly, i.e. they act directly on the current provided by a current source (not shown in the figure) for energizing the drive 13 and supply the drive 13 with the respective required engine current. Thus, no control signals generated by the single-board computers 20, 22 are forwarded to other power components or higher-level control systems, for example via the control lines or the bus systems 46, for activating and energizing the motor current.

The gripping unit 10 has force measuring sensors 28 on the jaws 18, wherein said force measuring sensors 28 measure the gripping force. The force measuring sensors 28 are connected to the two single-board computers 20, 22 via data lines 30. The measurement signals of the force measuring sensors 28 are consequently evaluated redundantly by both single-board computers 20, 22. On the drive 13, or on the shaft 16, two encoder sensors 32 are provided, the output signals of which are fed via data lines 34 to the single-board computers 20, 22.

In the area between the two jaws 18, a sensor in the form of a camera module 36 is provided. The output signals of the camera module 36 are supplied via data lines 38 to the two single-board computers 20, 22.

In order to measure the motor current provided by the single-board computers 20, 22 and the motor current consumed by the drive 13, a current measuring sensor 40 is provided in the power line 25, the output signals of which are supplied to the two single-board computers 20, 22 via the data lines 42.

For measuring the temperature in the gripping unit 10, a temperature sensor can also be provided (not shown in the figure), which supplies its output signals to both single-board computers 20, 22.

Furthermore, further environmental sensors (also not shown) may be provided, which in particular detect the proximity to the gripping device and supply their output signals also to the two single-board computers 20, 22.

The two single-board computers 20, 22 evaluate the supplied sensor signals independently. Control signals resulting from an appropriate programming are supplied to the evaluation unit 24, which carries out the redundancy check and then correspondingly drives the drive unit 14 or a brake 44 provided on the shaft 16.

The two single-board computers 20, 22 and optionally the evaluation unit 24 communicate with a higher-level controller via a corresponding network 46, which can be set up as Ethernet, WLAN or bus system.

In particular, the two single-board computers 20, 22 can be accessed via the higher-level control or else via an external tablet.

By means of the two single-board computers 20, 22, not only a corresponding energization of the drive 13 and thus activation of the two jaws 18 can take place, but also maintenance functions, diagnoses, analyses, power data transmissions, etc. can be carried out.

The invention claimed is:

1. A drive unit of an automation component, comprising a drive for driving the movable parts of the automation component and a control unit which controls the drive, whereby the control unit comprises at least one computing device, and the drive unit together with the drive, control unit and computing device is arranged in or on a base housing of the automation component, wherein the control unit comprises at least one computing device provided with an operating system, by means of which programs that are written in a higher programming language or programs that are translated from a higher programming language are executed on the computing device during the operation of the drive unit, wherein the drive unit is set up for use in human-robot cooperation, and in that the control unit comprises two separate computing devices for redundant data processing, and in that an evaluation logic for mutual monitoring and/or checking the redundancy of the computing device is provided.

2. The drive unit according to claim 1, wherein the at least one computing device is designed as single-board computer.

3. The drive unit according to claim 1, wherein the at least one computing device is programmed and set up for direct control of the drive without the interposition of a separately designed motor controller.

4. The drive unit according to claim 1, characterized in that the at least one computing device is set up for maintenance, for data transmission, for diagnosis, monitoring, also of sub-functions and/or for programming.

5. The drive unit according to claim 1, wherein the at least one computing device has a user interface or can be connected to a user interface.

6. The drive unit according to claim 1, characterized in that the operating system is a common operating system or a special operating system which is based on a common operating system.

7. The drive unit according to claim 1, wherein evaluation logic is set up in such a way that the respective operating state is known with sufficient probability by the mutual monitoring.

8. The drive unit according to claim 1, wherein sensors are provided in or on the automation component, wherein the sensor data generated by the sensors are processed by the at least one computing device.

9. The drive unit according to claim 8, wherein the sensors are formed as displacement sensors, force measuring sensors, rotary encoder sensors, current measuring sensors, proximity sensors, temperature sensor, humidity sensor and/or as a camera module.

10. The drive unit according to claim 1, wherein the two separate computing devices are additionally provided for diverse data processing.

11. An automation component, comprising movable parts and a drive unit having a drive for driving the movable parts of the automation component and a control unit which controls the drive, whereby the control unit comprises at least two computing devices, and the drive unit together with the drive, control unit and computing device is arranged in or on a base housing of the automation component, wherein the control unit comprises at least one computing device provided with an operating system, by means of which programs that are written in a higher programming language or programs that are translated from a higher programming language are executed on the computing device during the operation of the drive unit, wherein the drive unit is set up for use in human-robot cooperation, and in that the at least two computing devices perform redundant data processing, and in that an evaluation logic for mutual monitoring and/or checking the redundancy of the at least two computing devices is provided.

\* \* \* \* \*